United States Patent
Inamura et al.

(10) Patent No.: US 7,947,385 B2
(45) Date of Patent: May 24, 2011

(54) MAGNETIC STORAGE MEDIUM AND INFORMATION STORAGE DEVICE

(75) Inventors: Ryosaku Inamura, Kawasaki (JP); Yuta Toyoda, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 14 days.

(21) Appl. No.: 12/496,299

(22) Filed: Jul. 1, 2009

(65) Prior Publication Data
US 2010/0021766 A1  Jan. 28, 2010

(30) Foreign Application Priority Data

Jul. 25, 2008  (JP) ................. 2008-192483

(51) Int. Cl.
*G11B 5/66* (2006.01)
(52) U.S. Cl. .................................. 428/831.2
(58) Field of Classification Search .......... None
See application file for complete search history.

(56) References Cited

U.S. PATENT DOCUMENTS

| | | | |
|---|---|---|---|
| 4,657,824 A | | 4/1987 | Howard |
| 7,267,894 B2 * | | 9/2007 | Kanbe et al. ............. 428/831.2 |
| 7,691,500 B2 * | | 4/2010 | Shimizu et al. .............. 428/827 |
| 2002/0064691 A1 * | | 5/2002 | Kanbe et al. ............. 428/694 TS |
| 2002/0127435 A1 * | | 9/2002 | Uwazumi et al. ........ 428/694 TS |
| 2005/0255336 A1 * | | 11/2005 | Mukai ........................... 428/831 |

FOREIGN PATENT DOCUMENTS

| | | |
|---|---|---|
| JP | A 62-102419 | 5/1987 |
| JP | A 2005-353256 | 12/2005 |
| JP | A 2006-309919 | 11/2006 |
| JP | A 2007-179598 | 7/2007 |

OTHER PUBLICATIONS

Inamura et al, "Reduction of magnetic grain size of perpendicular recording media with CoCrW seed layer," J Appl Phys, vol. 105, 2009, pp. 07B721-1 to 07B721-3.*

* cited by examiner

*Primary Examiner* — Holly Rickman
(74) *Attorney, Agent, or Firm* — Greer, Burns & Crain, Ltd.

(57) ABSTRACT

A magnetic storage medium includes a seed layer made of non-magnetic and amorphous Co—Cr—W, an intermediate layer having a crystalline structure, which is made of a non-magnetic material on the seed layer and has a c-axis oriented in a thickness direction of the seed layer in a hexagonal close-packed structure, and a recording layer made of mainly a magnetic material on the intermediate layer and having information magnetically recorded therein.

10 Claims, 2 Drawing Sheets

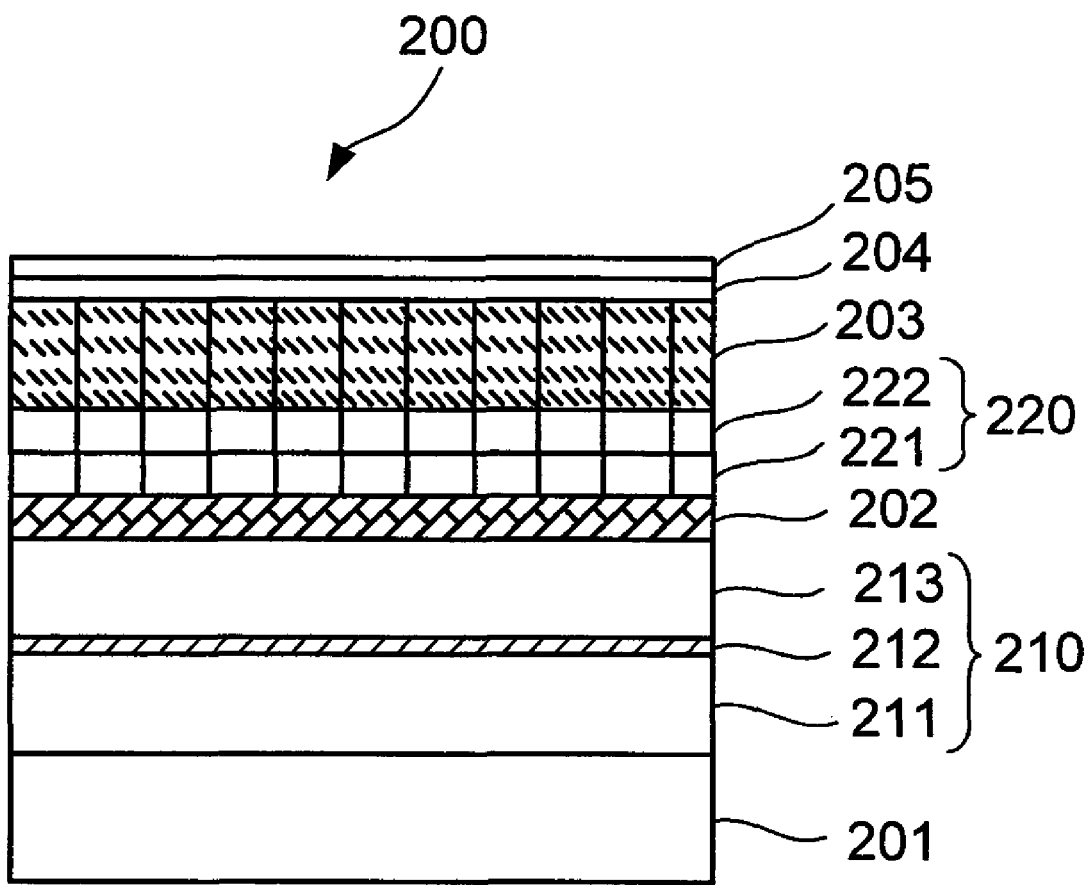

MAGNETIC STORAGE MEDIUM AND INFORMATION STORAGE DEVICE

CROSS-REFERENCE TO RELATED APPLICATION

This application is based upon and claims the benefit of priority of the prior Japanese Patent Application No. 2008-192483, filed on Jul. 25, 2008, the entire contents of which are incorporated herein by reference.

FIELD

The embodiments discussed herein are related to a magnetic storage medium, in which information is magnetically recorded, and an information storage device provided with such a magnetic storage medium.

BACKGROUND

Information storage devices typified by a magnetic disk device are classified into an internal type, in which an information storage device is incorporated in a personal computer (PC) or the like, and an external type, in which an information storage device is disposed outside of a PC or the like. In order to increase storage capacity, there is demand to increase a surface recording density of a magnetic storage medium incorporated in the information storage devices.

In general, reduction of a medium noise is effective in increasing a surface recording density of a magnetic storage medium. Here, a magnetic storage medium of a perpendicular magnetic recording system, which is high in stability of a recording bit in a high recording density, has been put in practical use in recent years. As one of means for reducing the medium noise in the magnetic storage medium of such a perpendicular magnetic recording system, attention has focused on means in which a recording layer magnetically recording information therein is equipped with a so-called granular structure. The granular structure of the recording layer is a structure in which oxide or nitride serving as a non-magnetic material is segregated on a grain interface between magnetic particles. Magnetic separation or isolation of the magnetic particle is excellently achieved in the granular structure. As a consequence, the magnetic particle is pulverized, thereby reducing the medium noise.

In the magnetic storage medium provided with the recording layer of the granular structure, as pulverization or equalization of the magnetic particle or reduction of crystalline orientation dispersion is more promoted, a higher reducing effect of the medium noise can be achieved. In view of this, there have been proposed various methods for further achieving the pulverization or equalization of the magnetic particle and the reduction of the crystalline orientation dispersion (i.e., higher orientation) in the granular structure.

For example, there has been proposed a technique in which an intermediate layer made of a non-magnetic material is disposed right under the recording layer and crystal grains forming the intermediate layer are separated via an interstice, thereby promoting the pulverization of the magnetic particles grown on the crystal grains (see, for example, Japanese Laid-open Patent Publication No. 2005-353256).

Moreover, in order to not only promote the pulverization of the magnetic particle but also achieve the equalization of the magnetic particle or the high orientation, there has been proposed a technique in which a layer called a seed layer is further disposed right under the intermediate layer.

For example, there has been proposed a technique in which a seed layer made of Ni—W in an fcc (face centered cubic) structure is disposed right under an intermediate layer made of Ru in an hcp (hexagonal close packed) structure (see, for example, Japanese Laid-open Patent Publication No. 2007-179598). In addition, there has been proposed a technique in which a seed layer made of Co—Cr—W in an hcp structure is disposed right under an intermediate layer made of Ru in an hcp structure (see, for example, Japanese Laid-open Patent Publication No. 62-102419). Additionally, there has been proposed a technique in which an amorphous seed layer is disposed right under such an intermediate layer (see, for example, Japanese Laid-open Patent Publication No. 2006-309919).

With these techniques, the formation of the intermediate layer on the seed layer can achieve the pulverization, equalization, or high orientation of the crystal grain of Ru in the intermediate layer, and further, can achieve the pulverization, equalization, or high orientation of the magnetic particle in the granular structure of the recording layer formed on the intermediate layer.

Here, a high recording density is being more demanded of the magnetic storage medium in recent years. As for the magnetic storage medium having the seed layer, the medium noise is preferably reduced by further promoting the pulverization of the magnetic particle in the recording layer, thereby achieving a high recording density.

SUMMARY

According to an aspect of the invention, a magnetic storage medium in a basic mode includes:

a seed layer made of non-magnetic and amorphous Co—Cr—W;

an intermediate layer having a crystalline structure, which is made of a non-magnetic material on the seed layer and has a c-axis oriented in a thickness direction of the seed layer in a hexagonal close-packed structure; and a recording layer made of mainly a magnetic material on the intermediate layer and having information magnetically recorded therein.

The inventors of the present application have found that in developing the magnetic storage medium according to the present invention, the use of the so-called seed layer made of non-magnetic and amorphous Co—Cr—W can achieve the pulverization, equalization, or high orientation of the magnetic particle in the recording layer formed on the intermediate layer on the seed layer more than that in the conventional technique. The present application has been accomplished based on the findings. In a basic mode of the magnetic storage medium, the seed layer is formed of the non-magnetic and amorphous Co—Cr—W, so that the pulverization or equalization of the crystal grain and the high orientation of a c-axis in a hexagonal close-packed (hcp) structure can be further achieved on the intermediate layer laminated on the seed layer. As a consequence, the pulverization, equalization, and high orientation of the magnetic particle in the recording layer formed on the intermediate layer can be further achieved, thereby reducing the medium noise, so as to achieve higher recording density in the magnetic storage medium.

According to another aspect of the invention, an information storage device in a basic mode includes:

a magnetic storage medium including:
a seed layer made of non-magnetic and amorphous Co—Cr—W;
an intermediate layer having a crystalline structure, which is made of a non-magnetic material on the seed layer and has a c-axis oriented in a thickness direction of the seed layer in a hexagonal close-packed structure; and a recording layer made of mainly a magnetic material on the intermediate layer and having information magnetically recorded therein; and a head which records and/or reproduces information with respect to the magnetic storage medium.

In the basic mode of the information storage device, the magnetic storage medium capable of further increasing the recording density, which is described above in reference to the basic mode, is installed, thereby storing information in a larger capacity.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram schematically illustrating the cross section of the magnetic disk illustrated in FIG. 1.

DESCRIPTION OF EMBODIMENTS

Figure 1:
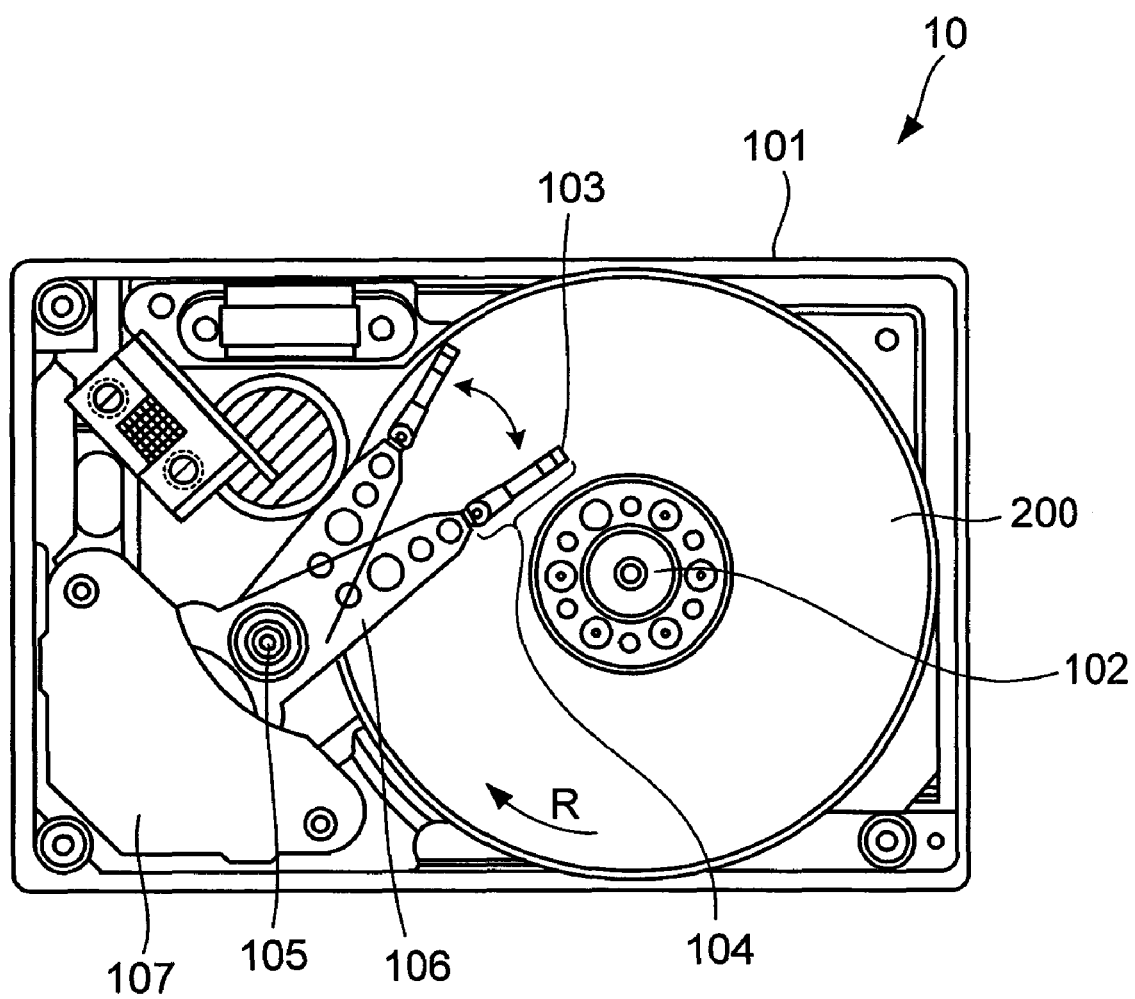
FIG. 1 illustrates a hard disk device (HDD) as a specific embodiment of the information storage device explained in the basic mode.

Specific embodiments of the magnetic storage medium and the information storage device explained as to the basic mode will be explained below referring to the drawings.

FIG. 1 illustrates a hard disk device (HDD) as a specific embodiment of the information storage device explained in the basic mode.

Inside of a housing 101 of an HDD 10 illustrated in FIG. 1 are housed with a magnetic disk 200 to be rotated on a rotary shaft 102, a head gimbal assembly 104 having a magnetic head 103 held at the tip thereof, for recording and reproducing information in and from the magnetic disk 200, a carriage arm 106 having the head gimbal assembly 104 fixed thereto, to move on the magnetic disk 200 on an arm shaft 105, and an arm actuator 107 for driving the carriage arm 106. Here, the magnetic disk 200 exemplifies the magnetic storage medium in the basic mode of the magnetic storage medium and the magnetic storage device whereas the magnetic head 103 exemplifies the head in the basic mode.

In recording the information in the magnetic disk 200 and reproducing the information recorded in the magnetic disk 200, the carriage arm 106 is driven by the arm actuator 107, so that the magnetic head 103 is positioned at a desired position on the rotating magnetic disk 200. The magnetic head 103 records pieces of information in sequence in the magnetic disk 200 passing right thereunder according to the rotation.

Here, the present embodiment employs a perpendicular magnetic recording system in which information is recorded by magnetization in a direction perpendicular to the disk surface of the magnetic disk 200. As a consequence, the magnetic disk 200 has a recording layer, described later, having a magnetic anisotropy in which a direction perpendicular to the disk surface is referred to as a magnetization easy axis. The information is recorded in the recording layer by utilizing two states in which the magnetization is oriented toward the obverse and the reverse of the magnetic disk 200.

In recording the information, the magnetic head proximate to the magnetic disk 200 receives an electric recording signal, and then, the magnetic head 103 applies a magnetic field of a polarity according to the recording signal to the magnetic disk 200. The magnetization in the recording layer is oriented toward either one of the obverse and reverse of the magnetic disk 200, according to the polarity of the applied magnetic field, thereby recording the information. In contrast, in reproducing the information, the magnetic head 103 detects a micromagnetic field produced by the magnetization in the recording layer, so that the information is taken out as an electric reproduction signal according to the polarity of the micro magnetic field.

FIG. 2 is a diagram schematically illustrating the cross section of the magnetic disk illustrated in FIG. 1.

As illustrated in FIG. 2, the magnetic disk 200 has a structure having a soft magnetic under layer 210, a non-magnetic seed layer 202, a non-magnetic intermediate layer 220, a recording layer 203, a protective layer 204, and a lubricating layer 205 laminated in this order on a glass non-magnetic substrate 201. Here, the non-magnetic seed layer 202, the non-magnetic intermediate layer 220, and the recording layer 203 exemplify the seed layer, the intermediate layer, and the recording layer in the basic mode, respectively.

Here, although in the present embodiment, the soft magnetic under layer 210 is formed directly on the non-magnetic substrate 201, the magnetic storage medium in the basic mode is not limited to this mode. For example, a layer for enhancing the adhesiveness of the soft magnetic under layer 210 or controlling the magnetic anisotropy may be formed between the non-magnetic substrate 201 and the soft magnetic under layer 210.

In addition, although the non-magnetic substrate 201 is made of glass in the present embodiment, the magnetic storage medium in the basic mode is not limited to this mode. For example, a non-magnetic substrate may be a chemically reinforcing glass substrate, a crystallization glass substrate, an Al substrate or an Al alloy substrate subjected to Ni—P plating, a plastic substrate, a Si substrate, a thermally oxidizing Si substrate, or the like.

The layers laminated on the non-magnetic substrate 201 will be explained below in sequence.

First of all, a description will be given of the soft magnetic under layer 210.

The soft magnetic under layer 210 serves as a magnetic path, through which the recording magnetic field from the magnetic head 103 illustrated in FIG. 1 passes. The soft magnetic under layer 210 has a lamination structure formed of a lower soft magnetic layer 211, a non-magnetic split layer 212, and an upper soft magnetic layer 213.

In general, it is preferable to control a magnetic domain in order to suppress a magnetic flux leaked from the soft magnetic under layer in the magnetic storage medium having the soft magnetic under layer.

As techniques for controlling the magnetic domain, there have been proposed, for example, a method for aligning magnetization directions in a soft magnetic under layer disclosed in a report: Toshio Ando et al., "Triple-Layer Perpendicular Recording Media for High SN Ratio and Signal Stability," *IEEE Transactions on Magnetics*, Vol. 33, No. 5, pp. 2983-2985, September, 1997, and a method for anti-ferromagnetically coupling two soft magnetic layers split via a very thin non-magnetic split layer as disclosed in "Japanese Laid-open Patent Publication No. 2001-155321."

The present embodiment employs the latter method. There is provided the soft magnetic under layer 210 having the lower soft magnetic layer 211, the non-magnetic split layer 212, and the upper soft magnetic layer 213 deposited in this order.

The lower soft magnetic layer 211 illustrated in FIG. 2 is made of Fe—Co—Ta—Zr as an amorphous soft magnetic material. Here, the material of the lower soft magnetic layer 211 is not limited to this, but may be other amorphous materials or soft magnetic materials such as Co—Zr—Nb, Co—Nb—Ta, Fe—Co—Zr—Nb, Fe—Co—B, Fe—Co—Cr—B, Ni—Fe—Si—B, Fe—Al—Si, Fe—Ta—C, Fe—Hf—C, Ni—Fe and the like in a fine crystalline structure region. In addition, it is preferable that the soft magnetic material forming the lower soft magnetic layer 211 preferably has an amorphous or fine crystalline structure in order to reduce noise from the soft magnetic under layer 210.

Moreover, the non-magnetic split layer 212 illustrated in FIG. 2 is made of Ru. Here, the material of the non-magnetic split layer 212 is not limited to this, but it may be an Ru alloy, a material disclosed in a report: S. S. P. Parkin, "Systematic Variation of the Strength and Oscillation Period of Indirect Magnetic Exchange Coupling through the 3d, 4d, and 5d Transition Metals," *Physical Review Letters*, Vol. 67, No. 25, pp. 3598-3601, Dec. 16, 1991, or the like. Although the thickness of the non-magnetic split layer 212 is not specified herein, a thickness appropriately ranges from about "0.5 nm" to about "1 nm" in the present embodiment in which Ru is used as the material in order to achieve the excellent anti-ferromagnetic coupling, as described above.

Additionally, the upper soft magnetic layer 213 illustrated in FIG. 2 is made of Fe—Co—Nb—Zr of a soft magnetic material.

The entire thickness of the soft magnetic under layer 210 having the three-layer structure, as described above, is not specified herein. For example, in the case where a saturation flux density Bs of the soft magnetic under layer 210 is 1 (T) or more, the thickness is preferably about "10 nm" or more, more preferably, about "30 nm" or more, from the viewpoint of recording/reproducing characteristics. Otherwise, the entire thickness of the soft magnetic under layer 210 is preferably about "100 nm" or less, more preferably, about "60 nm" or less, from the viewpoint of mass production equipment or a cost.

Incidentally, although the soft magnetic under layer 210 having the three layer structure, as described above, is disposed in the present embodiment, the magnetic storage medium in the basic mode is not limited to this mode. For example, the magnetic storage medium may be provided with a single soft magnetic under layer or no soft magnetic under layer. However, it is desirable to dispose the soft magnetic under layer so as to function as the magnetic path of the recording magnetic field from the magnetic head 103, and further, obtain a greater recording magnetic field and a greater magnetic field gradient, as described above.

With the soft magnetic under layer 210 in the present embodiment, the great recording magnetic field and the great magnetic field gradient can be obtained, and further, with the three-layer structure of the soft magnetic under layer 210, the magnetic flux can be excellently suppressed from being leaked from the soft magnetic under layer 210.

This indicates that an application mode, "the magnetic storage medium further includes a soft magnetic under layer formed of an amorphous soft magnetic material including Co and Fe, and the seed layer is formed on the soft magnetic under layer" is preferable to the basic mode. Furthermore, another application mode that "in the soft magnetic under layer, two soft magnetic layers, each being formed of the soft magnetic material, are laminated via a non-magnetic layer which is formed of a non-magnetic material and serves to anti-ferromagnetically couple magnetization in each of the two soft magnetic layers" is more preferable to the former application mode.

The soft magnetic under layer 210 in the present embodiment illustrated in FIG. 2 exemplifies the soft magnetic under layer in the application modes thereof. The non-magnetic seed layer 202 exemplifies the seed layer in the former application mode.

Subsequently, a description will be given of the non-magnetic seed layer 202 in the present embodiment.

The non-magnetic seed layer 202 is made of non-magnetic and amorphous Co—Cr—W such that a crystal grain in the non-magnetic intermediate layer 220 formed with Ru on the non-magnetic seed layer 202, as described later, is subjected to pulverization, equalization, and high orientation, and further, a magnetic particle in the recording layer 203 of a granular structure segregated with a non-magnetic material is subjected to pulverization, equalization, and high orientation on a grain interface between magnetic particles, as described later.

Although the particulars will be described later, the crystal grain of Ru forming the non-magnetic intermediate layer 220 formed on the non-magnetic seed layer 202 or a magnetic particle in the granular structure of the recording layer 203 has a hexagonal close-packed (hcp) structure. As described above, the magnetic disk 200 in the present embodiment is a magnetic storage medium of a perpendicular magnetic recording system. Therefore, in order to impart, to the recording layer 203, the magnetic anisotropy having the direction perpendicular to the disk surface as the magnetization easy axis, the c-axis of the hcp structure in the magnetic particle in the recording layer 203 needs to be oriented in the direction perpendicular to the disk surface. In order to allow the c-axis of the hcp structure in the magnetic particle to be oriented in this direction, the c-axis of the hcp structure in the crystal grain of Ru forming the non-magnetic intermediate layer 220 serving as a lower layer of the recording layer 203 needs to be oriented in this direction.

In contrast, the soft magnetic under layer 210 is made of an amorphous material, as described above. As a consequence, if the non-magnetic intermediate layer 220 is formed directly on the soft magnetic under layer 210, the orientation of the c-axis of the hcp structure may be possibly misaligned.

In the present embodiment, the non-magnetic seed layer 202 is provided to desirably direct the orientation of the c-axis of the hcp structure in the non-magnetic intermediate layer 220.

Incidentally, in the present embodiment, the non-magnetic seed layer 202 fulfills not only the function of desirably directing the orientation of the c-axis of the hcp structure in the non-magnetic intermediate layer 220 but also the function of achieving the pulverization, equalization, and high orientation of the crystal grain of Ru in the non-magnetic intermediate layer 220, and further, of achieving the pulverization, equalization, and high orientation of the magnetic particle of the recording layer 203.

In the conventional technique, such a non-magnetic seed layer is frequently made of a layer having a crystalline structure such as the fcc structure or the hcp structure. In order to achieve the pulverization, equalization, and high orientation of the magnetic particle in the non-magnetic seed layer having such a crystalline structure, the pulverization, equalization, and high orientation of the crystal grain need to be achieved in the non-magnetic seed layer per se. However, when the pulverization of the crystal grain proceeds beyond a certain extent, it becomes difficult to achieve both of the pulverization and the high orientation in the crystal grain.

There is a case in which the non-magnetic seed layer is made of an amorphous layer. In this case, since the high orientation in a layer formed on the non-magnetic seed layer is generally difficult, it is considered in the conventional technique that, also in the magnetic storage medium, the pulverization, equalization, and high orientation of the magnetic particle have hardly proceeded beyond a certain extent. However, the inventors of the present application have found that the use of a layer made of non-magnetic and amorphous Co—Cr—W as the non-magnetic seed layer can achieve the pulverization, equalization, and high orientation of the magnetic particle in the recording layer formed on the non-magnetic intermediate layer on the non-magnetic seed layer more than in the conventional technique.

The present invention has been accomplished based on the findings. As described above, the non-magnetic seed layer 202 in the present embodiment is made of non-magnetic and amorphous Co—Cr—W.

Although Co—Cr—W forming the non-magnetic seed layer 202 is not specified here, it may be a Co—Cr—W alloy having a composition including "35 at. %" or more and "55 at. %" or less of Cr and "3 at. %" or more and "25 at. %" or less of W.

In general, if Cr is less than "35 at. %", the magnetization of a Co—Cr alloy causes a medium noise. In contrast, if Cr exceeds "55 at. %", the probability of appearance of a sigma phase even in a thin film region becomes high, thereby degrading amorphism in the non-magnetic seed layer 202. This inhibits the growth of an initial layer of the crystal grain in the non-magnetic intermediate layer 220 formed on the non-magnetic seed layer 202, thereby largely dispersing the crystalline orientation, as described above. As a result, the composition of Cr in Co—Cr—W forming the non-magnetic seed layer 202 preferably ranges from "35 at. %" to "55 at. %", as described above.

If W is less than "3 at. %", the layer hardly becomes amorphous, thereby largely dispersing the crystalline orientation in the non-magnetic intermediate layer 220 formed on the non-magnetic seed layer 202. In contrast, if W exceeds "25 at. %", elements in a bcc group together with Cr occupy "60 at. %" or more. As a consequence, the probability of formation of the fine crystal of the bcc group even in the thin film state becomes high, thereby degrading the amorphism in the non-magnetic seed layer 202. This inhibits the growth of an initial layer in the non-magnetic intermediate layer 220 formed on the non-magnetic seed layer 202, thereby largely dispersing the crystalline orientation. As a result, the composition of W in Co—Cr—W forming the non-magnetic seed layer 202 preferably ranges from "3 at. %" to "25 at. %", as described above.

Moreover, although the thickness of the non-magnetic seed layer 202 is not specified herein, it is preferably "2 nm" or more and "10 nm" or less. This is because if the thickness is as thin as less than "2 nm," a Co—Cr—W film hardly becomes continuous, and therefore, the non-magnetic seed layer 202 per se is insufficiently formed, so that the crystalline orientation is largely dispersed on the non-magnetic intermediate layer 220 formed on the non-magnetic seed layer 202 or the recording layer 203 formed on the non-magnetic intermediate layer 220. In contrast, if the thickness exceeds "10 nm," Co—Cr—W is crystallized to become enormous, thereby causing an increase in size of the crystal grain in the non-magnetic intermediate layer 220 or the magnetic particle in the recording layer 203. An increase in thickness of the non-magnetic seed layer 202 signifies an increase in distance between the soft magnetic under layer 210 and the magnetic head 103 in the HDD 10 illustrated in FIG. 1. This increase induces a decrease in writing magnetic field from the magnetic head 103 or degradation of recording characteristics due to degradation of a magnetic field gradient. In view of this, the thickness of the Co—Cr—W seed layer is preferably "2 nm" or more and "10 nm" or less, as described above. More preferably, it is "5 nm" or more and "8 nm" or less.

Next, explanation will be made on the non-magnetic intermediate layer 220.

As described above, the non-magnetic intermediate layer 220 serves to orient the c-axis in the hcp structure of the magnetic particle in the recording layer 203 in the direction perpendicular to the disk surface. The non-magnetic intermediate layer 220 has a dual layer structure including a lower intermediate layer 221 and an upper intermediate layer 222, both of which are made of Ru of the hcp structure having the c-axis oriented in this direction.

An application mode that "the intermediate layer is made of an alloy including Ru or Ru" is preferable to the basic mode.

In this preferred application mode, the formation of the intermediate layer with the alloy containing Ru or Ru securely achieves the intermediate layer having the preferred crystalline structure. The non-magnetic intermediate layer 220 in the present embodiment exemplifies the intermediate layer in this application mode.

Incidentally, as described above, the recording layer 203 formed on the non-magnetic intermediate layer 220 in the present embodiment has the granular structure segregated with the non-magnetic material on the grain interface between the magnetic particles. Although the particles will be described later, the magnetic particle is made of a material having the hcp structure, like Ru forming the non-magnetic intermediate layer 220. During the formation of the recording layer 203, the magnetic particle attains the epitaxial growth on the crystal grain of Ru in the non-magnetic intermediate layer 220.

In order to obtain the favorable granular structure in which the magnetic particle of the recording layer 203 is sufficiently separated in the present embodiment, the crystal grains of Ru on the boundary of the recording layer 203 are isolated from each other via an interstice in the non-magnetic intermediate layer 220.

This indicates that an application mode, "the intermediate layer is made of plural crystal grains, and an interstice is formed between the crystal grains on a surface having the recording layer formed thereon" is preferable to the basic mode. Here, the interstice signifies a grain boundary. The grain boundary can be controlled by, for example, adjusting a process gas pressure or the like in forming the film.

The non-magnetic intermediate layer 220 in the present embodiment exemplifies the intermediate layer in this application mode.

In the present embodiment, the non-magnetic intermediate layer 220 has the dual layer structure including the lower intermediate layer 221 and the upper intermediate layer 222 so as to securely achieve the structure on the boundary. Each of the lower intermediate layer 221 and the upper intermediate layer 222 is made of Ru. The upper intermediate layer 222 has a columnar structure in which the crystal grains are isolated from each other via the interstice. This structure of the non-magnetic intermediate layer 220 in the present embodiment employs a structure disclosed in, for example, "Japanese Laid-open Patent Publication No. 2005-353256." With this dual layer structure, the crystal grains are securely isolated from each other on the boundary from the recording layer 203 in the non-magnetic intermediate layer 220 in the present embodiment.

This indicates that an application mode, "the intermediate layer is formed by laminating plural layers" is also preferable to the basic mode.

The non-magnetic intermediate layer 220 in the present embodiment exemplifies the intermediate layer in this application mode.

The intermediate layer in the basic mode is not limited to the dual layer structure in the present embodiment, but it may be a single intermediate layer. Even in the case of the single intermediate layer, it is preferable that the crystal grains may be physically isolated via the interstice on the boundary of the recording layer. In addition, the intermediate layer in the basic mode is not limited to the layer made of Ru, like in the present embodiment. For example, the layer may be made of an Ru alloy. Here, it is preferable that an Ru alloy forming the intermediate layer contains mainly Ru in "50 at. %".

Subsequently, the recording layer 203 will be described below.

As described above, the present embodiment employs the perpendicular magnetic recording system, in which information is recorded in the recording layer 203 by the effect of the magnetization oriented in the direction perpendicular to the disk surface. The perpendicular magnetic recording system has been known as a recording system having a high resistance against so-called thermal fluctuations. Also in the present embodiment, information is designed to be recorded in the recording layer 203 in this system, thus achieving excellent resistance against the thermal fluctuations.

This indicates that an application mode, "the recording layer is recorded by magnetization in which a magnetization easy axis is oriented in a thickness direction of the recording layer" is also preferable to the basic mode.

The recording layer 203 in the present embodiment exemplifies the recording layer in the application mode.

In the present embodiment, as a recording layer suitable for the perpendicular magnetic recording system, the recording layer 203 having the lamination including the plural layers having the granular structure having the columnar structure in which the magnetic particles are isolated in a non-magnetic and non-solid solution phase is provided. Additionally, as the magnetic material forming the magnetic particle of the granular structure, a Co—Cr—Pt alloy having the hcp structure in the present embodiment is used. As described above, the magnetic particle of the columnar structure is formed by the epitaxial growth of the Co—Cr—Pt alloy such that the c-axis is oriented in the direction perpendicular to the disk surface following the crystalline structure of Ru in the non-magnetic intermediate layer 220. As a consequence, each of the magnetic particles in the granular structure of the recording layer 203 has a strong magnetic anisotropy in which the direction perpendicular to the disk surface is regarded as the magnetization easy axis, thereby achieving the structure suitable for the perpendicular magnetic recording system in the recording layer 203.

This indicates that an application mode, "the recording layer has a granular structure, in which plural magnetic particles made of magnetic materials are separated via a non-magnetic material" is preferable to the basic mode.

The recording layer 203 in the present embodiment exemplifies the recording layer in the application mode.

Moreover, the recording layer is formed of the lamination including the plurality of layers having the granular structure so as to enhance recording/reproducing characteristics in the present embodiment, as described above. Although not employed in the present embodiment, a non-magnetic or weak magnetic layer may be interposed between the layers in the lamination structure. Additionally, in order to enhance the recording characteristics or corrosion resistance, a magnetic layer having a so-called continuous film structure may be formed on a granular magnetic layer.

The structure of the recording layer 203 in the present embodiment indicates that an application mode, "the recording layer is formed by laminating plural layers, each having the granular structure" is preferable to the basic mode.

The recording layer 203 in the present embodiment exemplifies the recording layer in the application mode.

The recording layer in the basic mode is not limited to the recording layer having the lamination structure, like in the present embodiment, but it may be a single recording layer.

Finally, a description will be given of the protective layer 204 and the lubricating layer 205.

The protective layer 204 serves to protect the surface of the recording layer 203, and further, the lubricating layer 205 serves to reduce a contact resistance between the magnetic head 103 and the magnetic disk 200. In the present embodiment, the protective layer 204 is made of DLC (Diamond-Like Carbon) and has a thickness of "4.0 nm." Furthermore, the lubricating layer 205 is made of a fluorine-based lubricant and has a thickness of "1.0 nm."

In the magnetic disk 200, the non-magnetic seed layer 202 is made of the non-magnetic and amorphous Co—Cr—W, thus more excellently achieving the pulverization, equalization, and high orientation of the crystal grain of Ru in the non-magnetic intermediate layer 220 on the non-magnetic seed layer 202 than in the conventional technique. As a consequence, the pulverization, equalization, and high orientation of the magnetic particle are further achieved in the granular structure of the recording layer 203, thereby reducing the medium noise in the magnetic disk 200. Thus, it is possible to achieve the higher recording density with respect to the magnetic disk 200 in the HDD 10.

EXAMPLES

Hereinafter, the present invention will be specifically explained by way of Examples and Comparative Examples, wherein the present invention is not limited to the Examples below.

Example 1

As a non-magnetic substrate 201 in Example 1, an Al alloy substrate plated with Ni—P is used.

A lower soft magnetic layer 211 in a soft magnetic under layer 210 is formed by depositing Fe—Co—Ta—Zr in "25 nm" at a making power of "1 kW" in Ar atmosphere of "0.5 Pa" by DC (Direct Current) sputtering.

Although the deposition is carried out by the DC sputtering, unless otherwise stated, in a description below, each of layers may be deposited by not only the DC sputtering but also RF (Radio Frequency) sputtering, pulse DC sputtering, CVD (Chemical Vapor Deposition), or the like.

Next, a non-magnetic split layer 212 is formed by depositing Ru on the lower soft magnetic layer 211 in "0.4 nm" at a making power of "150 W" in Ar atmosphere of "0.5 Pa."

Thereafter, an upper soft magnetic layer 213 is formed by depositing Fe—Co—Nb—Zr on the non-magnetic split layer 212 in "25 nm" at a making power of 1 kW in Ar atmosphere of "0.5 Pa" by the DC sputtering.

The non-magnetic seed layer 202 is formed by depositing non-magnetic and amorphous Co—Cr—W on the soft magnetic under layer 210. In Example 1, a composition including "53 at. %" of Co, "37 at. %" of Cr, and "10 at. %" of W is employed. The non-magnetic seed layer 202 having this composition is deposited in "6.5 nm" at a making power of "200 W" in Ar atmosphere of "0.5 Pa" by the DC sputtering.

Subsequently, a lower intermediate layer 221 is formed by depositing Ru on the non-magnetic seed layer 202 in "14 nm" at a making power of "800 W" in Ar atmosphere of "0.67 Pa," and then, an upper intermediate layer 222 is formed by depositing Ru in "7 nm" at a making power of "300 W" in Ar atmosphere of "5 Pa," thus forming a non-magnetic intermediate layer 220. Here, the upper intermediate layer 222 is formed in such a manner that crystal grains have a structure physically isolated via an interstice defined therebetween by the effects of high pressure gas and low deposition rate.

Thereafter, a recording layer having a granular structure is formed on the non-magnetic intermediate layer 220. Here, in Example 1, a single recording layer which is difficult from the viewpoint of pulverization, equalization, and high orientation of the magnetic particle but is easy from the viewpoint of film formation is employed, unlike the embodiment.

The recording layer have the granular structure obtained by segregating "8 mol %" of $TiO_2$ on a grain interface between the magnetic particles, each including "92 mol %" of Co—Cr—Pt having a composition containing "66 at. %" of Co, "13 at. %" of Cr, and "21 at. %" of Pt. In Example 1, the recording layer is deposited on the non-magnetic intermediate layer 220 at a making power of "300 W" in Ar atmosphere of "4 Pa."

Finally, a DLC protective layer 204 is deposited on the recording layer in "4 nm" by the CVD, and thereafter, a lubricating layer 205 is formed by applying a fluorine-based lubricant onto the protective layer 204 in "1 nm," followed by removing projections or foreign matters from the surface via a polishing tape.

In Examples 2 and 3 and Comparative Examples 1 to 3, described below, the layers are formed under the same formation conditions as those in Example 1 except for compositions of Co—Cr—W forming the non-magnetic seed layer 202.

Example 2

The composition of Co—Cr—W in Example 2 contains "58 at. %" of Co, "37 at. %" of Cr, and "5 at. %" of W.

Example 3

The composition of Co—Cr—W in Example 3 contains "60 at. %" of Co, "37 at. %" of Cr, and "3 at. %" of W.

Comparative Example 1

The composition of Co—Cr—W in Comparative Example 1 contains "62 at. %" of Co, "37 at. %" of Cr, and "1 at. %" of W.

Here, the amorphism in the non-magnetic seed layer 202 is broken by setting W smaller than "3 at. %" in Comparative Example 1.

Comparative Example 2

The composition of Co—Cr—W in Comparative Example 2 contains "33 at. %" of Co, "37 at. %" of Cr, and "30 at. %" of W.

In Comparative Example 2, the non-magnetic seed layer 202 takes on magnetism by setting Co smaller than "35 at. %", and further, its amorphism is broken by setting W greater than "25 at. %."

Comparative Example 3

The composition of Co—Cr—W in Comparative Example 3 contains "30 at. %" of Co, "60 at. %" of Cr, and "10 at. %" of W.

In Comparative Example 3, the non-magnetic seed layer 202 takes on magnetism by setting Co smaller than "35 at. %", and further, its amorphism is broken due to production of a sigma phase therein by setting Cr greater than "55 at. %."

In Comparative Examples 4 and 5, described below, layers are formed under the same formation conditions as those in Example 1 except for the thickness of the non-magnetic seed layer 202.

Comparative Example 4

The thickness of a non-magnetic seed layer 202 in Comparative Example 4 is "1 nm."

In Comparative Example 4, the formation per se of the non-magnetic seed layer 202 is insufficient by setting the thickness of the non-magnetic seed layer 202 to less than "2 nm."

Comparative Example 5

The thickness of a non-magnetic seed layer 202 in Comparative Example 5 is "15 nm."

In Comparative Example 5, the amorphism of the non-magnetic seed layer 202 is broken by setting the thickness of the non-magnetic seed layer 202 to greater than "10 nm."

Comparative Example 6

In Comparative Example 6, layers are formed under the same formation conditions as those in Example 1 except for a material forming a non-magnetic seed layer 202.

Ni—W having an fcc structure which has been frequently used as a seed layer in the conventional technique is used as a material forming the non-magnetic seed layer 202 in Comparative Example 6.

In Examples 1 to 3 and Comparative Examples 1 to 6, the particle diameter of a magnetic particle in the recording layer is measured, and further, $\Delta\theta50$ as a general index indicating a dispersion degree of crystalline orientation in the layer formed of the crystal grains is measured. The measurement results are illustrated in Table 1.

TABLE 1

| Example/ Comparative Example | Material | Thickness of Seed Layer (nm) | Magnetic Particle Diameter (nm) | $\Delta\theta50$ (°) |
|---|---|---|---|---|
| Example 1 | $Co_{53}$—$Cr_{37}$—$W_{10}$ | 6.5 | 6.6 | 3.4 |
| Example 2 | $Co_{58}$—$Cr_{37}$—$W_{5}$ | 6.5 | 6.7 | 3.5 |
| Example 3 | $Co_{60}$—$Cr_{37}$—$W_{3}$ | 6.5 | 6.8 | 3.6 |
| Comparative Example 1 | $Co_{62}$—$Cr_{37}$—$W_{1}$ | 6.5 | 6.8 | 4.6 |
| Comparative Example 2 | $Co_{33}$—$Cr_{37}$—$W_{30}$ | 6.5 | 6.7 | 4.2 |
| Comparative Example 3 | $Co_{30}$—$Cr_{60}$—$W_{10}$ | 6.5 | 6.8 | 4.5 |
| Comparative Example 4 | $Co_{53}$—$Cr_{37}$—$W_{10}$ | 1 | 6.8 | 4.3 |
| Comparative Example 5 | $Co_{53}$—$Cr_{37}$—$W_{10}$ | 15 | 8.7 | 3.4 |
| Comparative Example 6 | Ni—$W_{10}$ | 6.5 | 8.2 | 3.4 |

From Table 1, it is found that the particle diameter of the magnetic particle is small, that is, the pulverization can be achieved, and further, $\Delta\theta50$ is small, that is, the equalization and high orientation of the magnetic particle can be achieved in Examples 1 to 3 in which the non-magnetic seed layer 202 is sufficiently formed of the non-magnetic and amorphous Co—Cr—W, in comparison with other Comparative Examples. In particular, the pulverization can be achieved without any increase in $\Delta\theta50$ in Examples 1 to 3 in comparison with Comparative Example 6 in which the non-magnetic seed layer 202 is formed of Ni—W frequently used as the seed layer in the conventional technique. Thus, it is found that the pulverization and the high orientation can be excellently compatible with each other.

Moreover, the magnetic particle is pulverized but $\Delta\theta50$ is increased in each of Comparative Examples 1 to 3 in which the non-magnetic seed layer 202 takes on the broken amorphism or the magnetism. In addition, $\Delta\theta50$ is increased in Comparative Example 4 in which the thickness of the non-magnetic seed layer 202 is too small to satisfy the formation per se.

Additionally, crystallization of Co—Cr—W is confirmed by X-ray diffraction in Comparative Example 5 in which the thickness of the non-magnetic seed layer 202 is too large. The collapse of crystallinity of the non-magnetic seed layer 202 results in exaggeration of the particle diameter or an increase in $\Delta\theta50$.

From the comparison results among Examples 1 to 3 and Comparative Examples 1 to 6 described above, it is found that the non-magnetic seed layer 202 formed of the non-magnetic and amorphous Co—Cr—W excellently achieves the pulverization, equalization, and high orientation of the magnetic particle in the granular structure of the recording layer. This can reduce a medium noise in the magnetic disk 200, thereby achieving the high recording density in the magnetic disk 200. Thus, it is possible to provide an information recording apparatus such as an HDD having a greater recording capacity.

As described above, the present invention can provide the magnetic storage medium capable of recording information in higher recording density, and the information storage device having the magnetic storage medium mounted thereon.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A magnetic storage medium comprising:
   a seed layer made of non-magnetic and amorphous Co—Cr—W;
   an intermediate layer having a crystalline structure, which is made of a non-magnetic material on the seed layer and has a c-axis oriented in a thickness direction of the seed layer in a hexagonal close-packed structure; and
   a recording layer made of mainly a magnetic material on the intermediate layer and having information magnetically recorded therein.

2. The magnetic storage medium according to claim 1, wherein the recording layer is recorded by magnetization in which a magnetization easy axis is oriented in a thickness direction of the recording layer.

3. The magnetic storage medium according to claim 1, wherein the recording layer has a granular structure, in which a plurality of magnetic particles made of magnetic materials are separated via a non-magnetic material.

4. The magnetic storage medium according to claim 3, wherein the recording layer is formed by laminating a plurality of layers having the granular structure.

5. The magnetic storage medium according to claim 1, wherein the intermediate layer is made of an alloy including Ru or Ru.

6. The magnetic storage medium according to claim 1, wherein the intermediate layer is made of a plurality of crystal grains, and an interstice is formed between the crystal grains on a surface having the recording layer formed thereon.

7. The magnetic storage medium according to claim 1, wherein the intermediate layer is formed by laminating a plurality of layers.

8. The magnetic storage medium according to claim 1, further comprising a soft magnetic under layer formed of an amorphous soft magnetic material including Co and Fe, and
   wherein the seed layer is formed on the soft magnetic under layer.

9. The magnetic storage medium according to claim 8, wherein in the soft magnetic under layer, two soft magnetic layers, each being formed of the soft magnetic material, are laminated via a non-magnetic layer which is formed of a non-magnetic material and serves to anti-ferromagnetically couple magnetization in each of the two soft magnetic layers.

10. An information storage device comprising:
    a magnetic storage medium comprising:
    a seed layer made of non-magnetic and amorphous Co—Cr—W;
    an intermediate layer having a crystalline structure, which is made of a non-magnetic material on the seed layer and has a c-axis oriented in a thickness direction of the seed layer in a hexagonal close-packed structure; and
    a recording layer made of mainly a magnetic material on the intermediate layer and having information magnetically recorded therein; and
    a head which records and/or reproduces information with respect to the magnetic storage medium.

* * * * *